United States Patent [19] [11] 3,868,365
Dolfini et al. [45] Feb. 25, 1975

[54] METHOD FOR PREPARING 6-SUBSTITUTED PENICILLINS BY REPLACEMENT OF OXYGEN CONTAINING GROUPS

[76] Inventors: Joseph Edward Dolfini, Princeton, N.J.; William A. Slusarchyk, Belle Mead, N.J.; William Henry Koster, Lawrenceville, N.J.

[73] Assignee: E. R. Squibb & Sons, Inc., Princeton, N.J.

[22] Filed: Dec. 6, 1972

[21] Appl. No.: 312,470

[52] U.S. Cl................................ 260/239.1, 424/271
[51] Int. Cl.............................................. C07d 99/16
[58] Field of Search....................... 260/243 C, 239.1

[56] References Cited
UNITED STATES PATENTS
3,733,320   5/1973   Pines et al....................... 260/243 C Primary Examiner—Nicholas S. Rizzo
Attorney, Agent, or Firm—Lawrence S. Levinson; Merle J. Smith; Stephen B. Davis

[57] ABSTRACT

Disclosed is a method for replacing 6-lower alkanoyloxy and 6-aroyloxy groups from penicillins with other lower alkanoyloxy, lower alkoxy, aryloxy, amino, lower alkyl amino and azido moieties.

4 Claims, No Drawings

METHOD FOR PREPARING 6-SUBSTITUTED PENICILLINS BY REPLACEMENT OF OXYGEN CONTAINING GROUPS

Penicillins are of considerable interest to the pharmaceutical industry. Presently compounds of this type are being employed as potent antimicrobials. As in the case of the cephalosporins and tetracyclines, researchers are now trying to improve on the activity of these antibiotics by modifying the naturally occurring penicillins. Unfortunately, most antibiotics are quite complex and therefore simple reactions cannot be utilized to introduce the desired modifications. Usually considerable effort must be extended to devise a method for modifying such complex entities. Herein is described such a procedure which gives rise to useful antibacterial penicillins.

This invention relates to a method for the conversion of penicillins of the formula:

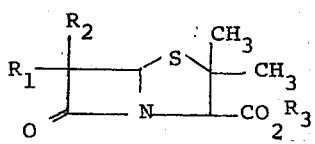

into compounds of the formula:

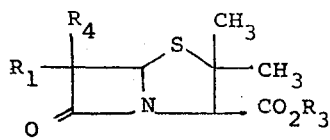

wherein $R_1$ is acylamino, a Schiff base such as benzalimino, or a substituted Schiff base; $R_2$ is lower alkanoyloxy or aroyloxy or substituted aroyloxy; $R_3$ is hydrogen, or a cation such as $Na^+$, $Li^+$, $Ca^{++}$, $K^+$, $NH_4^+$ and $(C_2H_5)_3NH^+$ or a readily cleavable ester such as t-butyl, trichloroethyl, trimethylsilyl or p-methoxybenzyl; and $R_4$ is lower alkoxy, other lower alkanoyloxy, aryloxy, azido, amino, mono- and di-lower alkyl amino by the use of certain mercury, silver, and thallium salts and an appropriate source of $R_4$, such as a lower alkyl alcohol, a phenol or its salt, lower alkanoic acid or salt thereof, amines, lower alkyl amines, di-lower alkyl amines or metal azides.

Acyl is defined in this invention as:

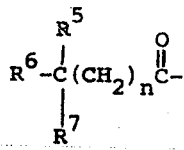

wherein $R^5$, $R^6$ and $R^7$ are hydrogen, lower alkyl, cycloalkyl, cycloalkenyl, cycloalkadienyl, lower alkoxy lower alkyl, thienyl, substituted thienyl, phenyl, substituted phenyl, phenoxy, substituted phenoxy, amino, nitro, halo, mercapto, lower alkylmercapto, lower alkylmercapto lower alkyl, phenylthio and substituted phenylthio wherein the substituents on the thienyl, phenyl, phenoxy, and phenylthio may be one or more of the following, lower alkyl, lower alkoxy, halo, nitro, amino and trifluoromethyl and $n$ is either 0 or an integer from 1 to 4.

$R^8CO$— wherein $R^8$ is hydrogen, amino, phenyl, substituted phenyl, lower alkoxy, thienyl, substituted thienyl, phenoxy, lower alkylthio, substituted phenoxy, β-lower alkenyl, β-lower alkylthio lower alkenyl, β-lower alkoxy lower alkenyl and β-lower alkenyloxy lower alkyl, wherein the substituents on the thienyl, phenyl and phenoxy may be one or more of the following: lower alkyl, lower alkoxy, halo, nitro, amino and trifluoromethyl.

Lower alkyl is defined as a branched or straight chain having from one to six carbon atoms. This definition also applies to terms incorporating lower alkyl with other groups, such as aryl lower alkyl which is intended to mean an aryl group linked to an alkyl group having one to six carbon atoms.

Aryl is defined as phenyl and α- and β-naphthyl.

"Substituted" as in substituted Schiff base, substituted aryl or substituted benzalimino is intended to mean unless specifically defined otherwise as mono- or disubstituted wherein said substituents may be lower alkyl, lower alkoxy, nitro, chloro, fluoro or trifluoromethyl.

Numerous modifications of the naturally occurring penicillins have already been made in an effort to enhance antimicrobial activity with a certain degree of success being achieved. One of the positions of the penicillin nucleus which a number of researchers have focused upon as a place for introducing new groupings is the 6-position. Since substituents on the 6α-position tend to demonstrate higher degrees of antimicrobial activity than 6β-substituents, attempts to devise new syntheses for introducing substituents into this position are generally directed to the introduction of 6α-substituents.

This invention teaches how one may convert the readily prepared 6-acyloxy derivatives to compounds wherein the 6-acyloxy group is replaced by lower alkoxy, aryloxy, other lower alkanoyloxy, azido, amino and lower alkylamino groups.

The above described starting materials of the structure

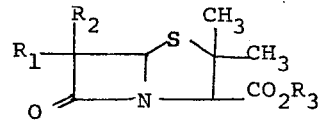

wherein $R_1$ through $R_3$ are as previously defined are converted into the compounds of this invention having the formula:

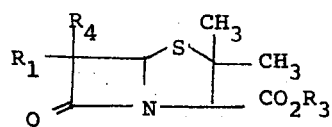

wherein $R_1$ to $R_4$ are as previously described, by the use of a reagent to supply the grouping which shall ultimately be $R_4$ in the presence of a mercury, silver or thallium salt catalyst. The cations to be used as catalysts are preferably in their highest oxidation state ("ic" form) and the anions are preferably one of the following: lower alkoxy, lower alkanoyloxy, cyano, nitrate, fluoro, bromo, sulphate and chloro.

For $R_4$ to be lower alkoxy, the reagent may be the corresponding lower alkanol. In turn, lower alkanoyloxy is introduced by utilizing the corresponding lower alkanoic acid or a heavy metal salt thereof, (mercury, silver, etc.); aryloxy is introduced by utilizing a phenol or salt thereof, azido is introduced by the use of an azide salt, such as potassium or sodium azide in the presence of catalyst, and amino is introduced by the use of an excess of amine in the presence of catalyst.

The reactions of this invention are preferably conducted in inert solvents, such as dimethoxyethane, dioxane, dimethylformamide, and tetramethylurea at temperatures from about $-10°$ to about $110°C$, preferably from about $0°$ to about $70°C$. However, where a lower alkoxy group is being introduced, the corresponding alcohol may be employed as the reaction solvent. The replacement reactions of this invention take place at a relatively rapid rate so that the reaction time required is usually from about a few minutes to several hours at ambient temperature.

While this reaction is of a general nature, the preferred compounds to be prepared by the process of this invention are those of the formula:

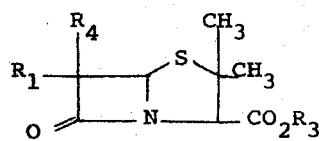

wherein $R_1$ is benzalimino, p-nitrobenzalimino, p-methoxybenzalimino; thienylacetamido, α-aminophenylacetamido, α-amino-1,4-cyclohexadienylacetamido, phenylacetamido or phenoxyacetamido, and $R_4$ is lower alkoxy and lower alkanoyloxy, aryloxy and azido.

In addition, it has been found that if one employs a 6α-alkanoyloxy- or 6α-aryloxy-6-benzalimino penicillanic acid or its ester, one obtains almost exclusively 6α$R_4$-substitution, whereas if a 6α-alkanoyloxy- or 6α-aryloxy-6-acylamino penicillanic acid compound is employed, the relative amounts of isomers obtained are determined by the nature of the solvent or catalyst used.

This invention is intended to encompass the preparation of both 6α and 6β isomers, in addition to those which may also be encountered at other sites in the compounds of this invention.

The penicillins which may be prepared by this invention are useful against gram-positive bacteria, such as *Staphylococcus aureus* and *Streptococcus pyogenes*, and especially against gram-negative bacteria such as *Escherichia coli* and *Proteus vulgaris*.

EXAMPLES

EXAMPLE 1

6α-Methylthio-6-benzaliminopenicillanic Acid p-Methoxybenzyl Ester

Method A. To a stirred solution of 6-benzaliminopenicillanic acid p-methoxybenzyl ester (1.04 g, 2.43 mmol) in dimethoxyethane (150 ml) at $-10°$ is added potassium t-butoxide (272 mg, 2.43 mmol). The orange solution is stirred for two minutes, and methyl methanethiolsulfonate (306 mg, 2.43 mmol) is added. Aftr stirring for 1 hour at $-10°$, the mixture is poured into pH 6.6 buffer (300 ml) and extracted with ethyl acetate. Evaporation of the dried $(MgSO)_4$ extract gives 1.10 g of XVII (95% yield) as a yellow oil. The oil has: ir $(CHCl_3)$ 1765 ($\beta$-lactam C=O), 1740 (ester C=O) and 1610cm$^{-1}$ (C=N); pmr $(DCCl_3)$ τ8.67 (3H,s,—CH$_3$), 8.57 (3H,s,—CH$_3$), 7.83 (3H,s,—SCH$_3$), 6.37 (3H,s,—OCH$_3$), 5.57 (1H,s,C-3), 4.93 (2H,s,—OCH$_2$), 4.43 (1H,s,C-5), 2.93 (9H,m,aromatic), and 1.33 (1H,s,CH=N) mass spectrum molecular ion at m/e 470, base peak at m/e 121.

Method B. Methylsulfenyl Chloride Procedure

The procedure in part A is followed using 2.43 mmol of methylsulfenyl chloride in place of methylmethanethiolsulfonate.

EXAMPLE 2

6α-Methylthio-6-benzaliminopenicillanic Acid Methyl Ester

By following the procedure in Example 1, but substituting 6-benzaliminopenicillanic acid methyl ester for the Schiff base substrate, the desired product is obtained.

EXAMPLE 3

6α-Phenylthio-6-(p-nitrobenzalimino)penicillanic Acid p-Methoxybenzyl Ester

By following the procedure in Example 1, method B, but substituting 6(p-nitrobenzalimino)penicillanic acid p-methoxybenzyl ester for the Schiff base substrate and phenylsulfenyl chloride for methylsulfenyl chloride, the desired product is obtained.

EXAMPLE 4

6α-Ethylthio-6-(p-methoxybenzalimino)penicillanic Acid p-Methoxybenzyl Ester

By following the procedure in Example 1, method B, but substituting 6-(p-methoxybenzalimino)penicillanic acid p-methoxybenzyl ester for the Schiff base substrate and ethylsulfenyl chloride for methylsulfenyl chloride, the desired product is obtained.

EXAMPLE 5

6α-Methylthio-6-phenoxyacetamidopenicillanic Acid p-Methoxybenzyl Ester

To a solution of the methylthio Schiff base of Example I (104 mg, 2.45 mmol) in 4 ml of dimethoxyethane is added phenoxyacetyl chloride (33.5 ml, 2.45 mmol), followed by water (4 ml, 2.45 mmol). The mixture is stirred for 40 minutes at room temperature and poured into water. Extraction with ethyl acetate gives a yellow oil (61 mg) that is purified by tlc on Quantum PQ1F silica gel in the system, hexane-ethyl acetate (4:1), to give 32 mg (25% yield) of the desired product as a colorless oil with: ir $(CHCl_3)$ 1780 ($\beta$-lactam C=O), 1745 (ester C=O), and 1692 (amide C=O) pmr $(DCCl_3)$ τ8.67 (3H,s,—CH$_3$), 8.53 (3H,s,—CH$_3$), 7.73 (3H,s,—SCH$_3$), 6.20 (3H,s,—OCH$_3$), 5.63 (1H,s,C-3), 5.50 (2H,s,—CH$_2$—C=O), 4.90 (2H,s,—OCH$_2$), 4.45 (1H,s,C-5), 3.00 (9H,s,aromatic), and 1.93 (1H,m,N—H).

The desired amide is also prepared in 20% yield by treating the methylthio Schiff base of Example I with equivalent amounts of p-toluenesulfonic acid monohy-

EXAMPLE 6

6α-Methylthio-6-phenylacetamidopenicillanic Acid p-Methoxybenzyl Ester

The 6α-methylthio amide is obtained in 14% yield by the procedure described for the preparation of methylthio amide in Example 5, but substituting phenylacetylchloride for phenoxyacetyl chloride. The desired product has: ir (CHCl$_3$) 1775 (β-lactam C=O) 1740 (ester C=O), and 1680cm$^{-1}$ (amide C=O), pmr (DCCl$_3$) τ8.70 (3H,s,—CH$_3$), 7.83 (3H,s,—SCH$_3$),

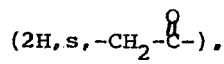

6.18 (3H,s,—OCH$_3$), 5.63 (1H,s,C-2), 4.88 (2H,s,—OCH$_2$), 4.45 (1H,s,C-5), and 3.30–2.57 (10H,m,N-H and aromatics).

EXAMPLE 7

6α-Methylthio-6-(2-thienyl)acetamidopenicillanic Acid Trichloroethyl Ester

By following the procedure in Example 5 but substituting 6α-methylthio-6-benzaliminopenicillanic acid trichloroethyl ester for the Schiff base and (2-thienyl)acetyl chloride for phenoxyacetyl chloride, the desired product is obtained as an amorphous residue.

EXAMPLE 8

6α-Acetoxy-6-phenylacetamidopenicillanic Acid p-Methoxybenzyl Ester a. To a suspension of the 6α-methylthio ester (Example 6) (1.5 mmol) in 5 ml of dimethoxyethane is added mercuric acetate (1.5 mmol). The mixture is stirred under nitrogen for 20 minutes at room temperature. The precipitate is filtered and washed with dimethoxyethane yielding a pale yellow powder. The filtrate is evaporated to a residue that is taken up in benzene-water. The benzene layer is washed with water, dried (Na$_2$SO$_4$) and evaporated to give the above named ester.

b. To 109 mg (0.25 mmole) of methylthio amide (Example 6) in 2 ml of acetic acid is added 164 mg (2 mmoles) of sodium acetate, followed by 80 mg (0.25 mmole) of mercuric acetate. The mixture is stirred for 15 minutes at room temperature, and the acetic acid is removed in vacuo. The residue is taken up in benzene and water. The benzene layer is washed with aqueous sodium chloride solution, dried (Na$_2$SO$_4$), and evaporated to give the ester as a residue.

EXAMPLE 9

6α-Methylthio-6-benzaliminopenicillanic Acid and 6α-Methylthio-6-aminopenicillanic Acid To a slurry of 6-benzaliminopenicillanic acid (5.11 g, 16.9 mmol) in dry dimethoxyethane (200 ml) at room temperature is added potassium t-butoxide (1 89 g, 16.9 mmol). The mixture turned orange, and complete solution occurred after 3 minutes. Trimethylsilyl chloride (1.83 g, 16.9 mmol) is added, and the mixture is stirred for 12 minutes as it cools to −10°. Potassium t-butoxide (1.89 g, 16.9 mmol) is added, and the solution turns red. After 15 minutes, methyl methanethiosulfonate (2.12 g, 16.9 mmol) is added, and stirring is continued for 30 minutes at −10°. The dimethoxyethane is removed in vacuo, and the residue is taken up in pH 7.8 phosphate buffer and EtOAc. The EtOAc layer is discarded, and the aqueous layer is washed repeatedly with EtOAc. The EtOAc washings are discarded, and the aqueous part is layered with EtOAc and adjusted to pH 4.0 with dilute HCl. Extraction with CHCl$_3$ and EtOAc gives a residue, after drying (MgSO$_4$) and concentration. Trituration of the residue with CHCl$_3$ gives 240 mg of 6-α-methylthio-6-aminopenicillanic acid as a solid and a supernate. Evaporation of the supernate gives 650 mg of 6-α-methylthio-6-benzylimino penicillanic acid (19% yield) as an oil.

Adjustment of the pH 4 aqueous solution to pH 1.9 and extraction with EtOAc gives a further quantity of the amino acid (800 mg), for a total yield of 23%.

The amorphous amino acid has: ir (Nujol) 1755 (β-lactam C=O), and 1715cm$^{-1}$ (acid C=O); mp 172°-176° (dec); pmr (DMSO-d$_6$) τ8.60 (3H,s,—CH$_3$), 8.53 (3H,s,—CH$_3$), 7.85 (3H,s,—SCH$_3$), 5.82 (1H,s,C-5), and 3.90 (3H,broad,NH$_3$+); mass spectrum, molecular ion m/e 262, base peak m/e 160. Anal. Calcd. for C$_9$H$_{14}$N$_2$O$_3$S$_2$: C,41.22; H,5.38; N,10.68. Found: C,41.88; H,5.78; N,10.00.

The Schiff base has: ir (CHCl$_3$) 1760 (β-lactam C=O), 1720 (COOH), and 1622 cm$^{-1}$ (C=N); pmr (DCCl$_3$) τ8.43 (6H,s,2-CH$_3$), 7.73 (3H,s,SCH$_3$), 5.60 (1H,s,C-3), 4.45 (1H,s,C-5), 4.60 (5H,m,aromatics), 1.57 (1H,broad,COOH); mass spectrum of trimethylsilyl ester, molecular ion at m/e 422.

EXAMPLE 10

6α-Methylthio-6-phenoxyacetamidopenicillanic Acid

To a stirred suspension of the methylthio amino acid from Example 9 (127 mg, 0.485 mmol) in dimethoxyethane (12 ml) is added N,O-bis-trimethylsilylacetamide (100 ml, 0.485 mmol). Solution occurs after 15 minutes of stirring. Triethylamine (68 ml, 0.485 mmol) and phenoxyacetyl chloride (67 ml, 0.485 mmol) are added sequentially, and the mixture is stirred for 1.5 hour at room temperature and concentrated under vacuum to a residue. The residue is taken up in EtOAc-H$_2$O, and the water layer is discarded. Water is added to the EtOAc layer, and the pH is adjusted to 7.5. The EtOAc layer is discarded, and the aqueous solution is covered with EtOAc and adjusted to pH 3.2 with dilute HCl. The resulting EtOAc extract is dried (Na$_2$SO$_4$) and evaporated to a residue. Trituration with hexanebenzene gives 72 mg of amorphous product (38% yield); ir (CHCl$_3$) 1780 (β-lactam C=O), 1730 (COOH), and 1690cm$^{-1}$ (amide C=O), pmr (DCCl$_3$) τ8.47 (6H,s,2CH$_3$), 7.70 (3H,s,—SCH$_3$), 5.50 (1H,s,C-3), 5.33 (2H,s,O—CH$_2$), 4.35 (1H,s,C-5), 2.83 (5H,m,aromatics), and 2.30 (1H,s,N—H); mass spectrum of trimethylsilyl ester, molecular ion at m/e 468.

EXAMPLE 11

6-Methylthio-6-phenylacetamidopenicillanic Acid

This acid is obtained in 78% yield by the method described for the preparation of the acid of the previous example, but by substituting phenylacetyl chloride in place of phenoxyacetyl chloride. The amorphous acid has: ir (CHCl$_3$) 1777 (β-lactam C=O), 1725 (COOH), and 1680cm$^{-1}$ (amide C=O); pmr (DCCl$_3$) τ8.57 (6H,m,2CH$_3$), 7.83 (3H,s,—SCH$_3$), 6.38

(2H,s,—CH₂), 5.67 (1H,s,C-3), 4.48 (1H,s,C-5), 2.67 (5H,m,aromatics), 2.17 (1H,m,N—H); mass spectrum of trimethylsilyl ester, molecular ion at m/e 452.

EXAMPLE 12

6α-Acetoxy- and 6β-acetoxy-phenylacetamidopenicillanic Acid p-Methoxybenzyl Esters A mixture of 0.14 mmole of 6α-acetoxy compound (Example 8) and 0.14 mmole of mercuric acetate in 0.5 ml of dimethylformamide is stirred under nitrogen at room temperature for 25 minutes. The mixture is taken up in water and benzene, and the benzene layer is washed twice with water, dried (Na₂SO₄), and evaporated in vacuo to give a residue consisting of approximately equal quantities of the 6-α and 6-β acetoxy epimers.

EXAMPLE 13

6-Benzalimino-6α-acetoxypenicillanic Acid p-Methoxybenzyl Ester

A mixture of mercuric acetate (431 mg, 0.135 mmol) and the methylthio Schiff base from Example 1 (0.124 mmol) in dimethoxyethane (20 ml) is stirred at room temperature for 30 minutes. Dilution with anhydrous ether (100 ml) and filtration through Celite removes insoluble material. After stripping solvent under reduced pressure, the residue is taken up in ether and washed with water. The organic layer is treated with Norite, and the volume of solvent is reduced, yielding the above named product.

EXAMPLE 14

6α-Azido and 6β-azido-6-phenylacetamidopenicillanic Acid p-Methoxybenzyl Esters To 63 mg (0.14 mmole) of 6α-acetoxy compound (Example 8) in 0.4 ml of dimethylformamide is added 92 mg (1.4 mmole) of sodium azide followed by 45 mg (0.14 mmole) of mercuric acetate. The mixture is stirred under nitrogen for 30 minutes at room temperature. The solvent is removed under reduced pressure, and the residue is taken up in benzene and water. The benzene layer is washed three times with water, dried (Na₂SO₄) and evaporated, yielding 60 mg of residue consisting of 6α-azido- and 6β-azido-6-phenylacetamidopenicillanic acid p-methoxybenzyl esters.

EXAMPLE 15

Methanol Solvolysis of 6α-Acetoxy- and 6β-acetoxy-6-phenylacetamidopenicillanic acid p-Methoxybenzyl Esters To a solution of 465 mg (1.04 mmole) of an approximately 50:50 mixture of 6α-acetoxy and 6β-acetoxy epimers (Example 12) in 3 ml of methanol is added 332 mg (1.04 mmole) mercuric acetate. The mixture is stirred under nitrogen at room temperature for 40 minutes. The methanol is removed under reduced pressure, and the residue is taken up in benzene and water. The benzene layer is washed with water, dried (Na₂SO₄) and evaporated to give a residue consisting of 6α-methoxy- and 6β-methoxy-6-phenylacetamidopenicillanic acid esters.

EXAMPLE 16

6-Benzalimino-6α-methoxypenicillanic Acid p-Methoxybenzyl Ester

A mixture of mercuric acetate (1 mmol) and the 6-acetoxy Schiff base (1 mmol) from Example 13 in methanol is stirred for 30 minutes at room temperature. The mixture is evaporated to a residue which is taken up in benzene and water. The benzene layer is washed with water, dried (Na₂SO₄), and evaporated to a residue. Crystallization of the residue from methanol gives the desired product.

EXAMPLE 17

6-Benzalimino-6α-ethoxypenicillanic Acid p-Methoxybenzyl Ester

The procedure described in Example 16 is used to prepare the above named compound. The acetoxy Schiff base from Example 13 is solvolyzed in absolute ethanol and catalyzed by the addition of 1 equivalent of mercuric acetate. After the workup, the 6α-ethoxy Schiff base is obtained.

EXAMPLE 18

General Procedure for the metal catalyzed solvolysis of the 6-alkanoyloxy- or 6-aroyloxy-penams (I) shown in Table I.

To a solution or suspension of the 6-alkanoyloxy- or 6-aroyloxy-penam (I) in the indicated anhydrous solvent system, is added 1.0 equivalent of metal catalyst and 4–10 equivalents of organic salt, if indicated in Table I. The heterogenous mixture is stirred, preferably under an inert atmosphere, at the temperature shown in Table I. The reaction is best followed to completion by monitoring the mixture by thin layer chromatography since reaction times are found to vary. After removal of the solvent system in vacuo, the residue is diluted with an organic solvent, which is immiscible with water, and filtered to remove insoluble materials. The solution is washed with dilute aqueous sodium bicarbonate solution and water, the organic layer is dried, and solvent is removed under reduced pressure. An amorphous residue is obtained containing the appropriate penam derivative indicated in Table I.

TABLE I

| R₁ | R₂ | R₃ | R₄ | Catalyst | Solvent | Temp. |
|---|---|---|---|---|---|---|
| -CH₂-CONH | -OAc (α) | t-butyl | OAc (α+β) | Hg(OAc)₂ | DMF | 25° |

TABLE I (Continued)

| R$_1$ | R$_2$ | R$_3$ | R$_4$ | Catalyst | Solvent | Temp. |
|---|---|---|---|---|---|---|
| C$_6$H$_5$-CH$_2$-CONH | -OAc($\alpha$) | t-butyl | OCH$_3$ ($\beta$) | Hg(OAc)$_2$ | CH$_3$OH | 25° |
| C$_6$H$_5$-CH$_2$-CONH | -OAc($\alpha$) | t-butyl | OCH$_3$ ($\alpha+\beta$) | Hg(OAc)$_2$ | CH$_3$OH-DMF | 25° |
| C$_6$H$_5$-S-CH$_2$-CONH | -OAc($\alpha+\beta$) | t-butyl | OCH$_3$ ($\alpha+\beta$) | Hg(OAc)$_2$ | CH$_3$OH | 25° |
| C$_6$H$_5$-CH(NH$_2$)-CONH | OAc($\alpha+\beta$) | CH$_3$O-C$_6$H$_4$-CH$_2$ | OCH$_3$ ($\alpha+\beta$) | Hg(OAc)$_2$ | CH$_3$OH | 25° |
| CH$_3$-CH$_2$-CONH | OOCC$_6$H$_5$ ($\alpha$) | CH$_2$-CCl$_3$ | OCH$_3$ ($\alpha+\beta$) | Hg(OAc)$_2$ | CH$_3$OH-DMF | 25° |
| C$_6$H$_5$-O-CH$_2$-CONH | OAc($\alpha+\beta$) | CH$_3$ | OCH$_2$CH$_3$ ($\alpha+\beta$) | Hg(OCH$_3$)$_2$ | CH$_3$CH$_2$OH | 25-80° |
| C$_6$H$_5$-OCH$_2$CONH | OAc($\alpha+\beta$) | t-butyl | OCH$_2$CH$_3$ ($\alpha+\beta$) | Hg(OAc)$_2$ | CH$_3$CH$_2$OH | 25° |
| phthalimido-N- | OAc($\alpha+\beta$) | CH$_3$O-C$_6$H$_4$-CH$_2$- | OCH$_3$ ($\alpha+\beta$) | AgOAc | CH$_3$OH | 25° |
| phthalimido-N- | OAc($\alpha+\beta$) | CH$_3$O-C$_6$H$_4$-CH$_2$- | OCH$_3$ ($\alpha+\beta$) | AgBF$_4$ | CH$_3$OH | 25° |
| phthalimido-N- | OAc($\alpha+\beta$) | CH$_3$O-C$_6$H$_4$-CH$_2$- | OCH$_3$ ($\alpha+\beta$) | Tl(OAc)$_3$ | CH$_3$OH | 25° |
| phthalimido-N- | OAc($\alpha+\beta$) | CH$_3$O-C$_6$H$_4$-CH$_2$- | piperidino ($\alpha+\beta$) | HgCl$_2$ | piperidine/DME | 25° |
| phthalimido-N- | OAc($\alpha+\beta$) | CH$_3$O-C$_6$H$_4$-CH$_2$- | NH$_2$ ($\alpha+\beta$) | HgCl$_2$ | DME/NH$_3$ | 25° |
| phthalimido-N- | OAc($\alpha+\beta$) | CH$_3$O-C$_6$H$_4$-CH$_2$- | N(CH$_3$)$_2$ ($\alpha+\beta$) | HgCl$_2$ | DME/(CH$_3$)$_2$NH | 25° |
| C$_6$H$_5$-CH(NH$_2$)-CONH | OAc($\alpha+\beta$) | t-butyl | -O-C$_6$H$_5$ ($\alpha+\beta$) | Hg(OCH$_3$)$_2$ | C$_6$H$_5$-ONa in DMF | 25-80° |
| furyl-CH$_2$-CONH | OAc($\alpha+\beta$) | CH$_2$-CCl$_3$ | OOCCH$_2$CH$_3$ ($\alpha+\beta$) | Hg(OCH$_3$)$_2$ | CH$_3$CH$_2$COONa in DMF | 25-80° |

TABLE I (continued)

| $R_1$ | $R_2$ | $R_3$ | $R_4$ | Catalyst | Solvent | Temp. |
|---|---|---|---|---|---|---|
| C₆H₅-CH₂-CONH | OAc(α) | t-butyl | -N₃ (α+β) | Hg(OAc)₂ | NaN₃, DMF | 25° |
| (thienyl)-CH₂-CONH | OAc(α) | CH₃O-C₆H₄-CH₂ | -N₃ (α+β) | Hg(OAc)₂ | NaN₃, DMF | 25° |
| C₆H₅-CH₂-CONH | OAc(α) | t-butyl | (CH₃)₂N- | Hg(OAc)₂ | (CH₃)₂NH, DMF | 25° |
| (cyclohexyl)-CONH | OAc(α) | t-butyl | -N₃ (α+β) | Hg(OCH₃)₂ | NaN₃, DMF | 25° |
| O₂N-C₆H₄-CH=N- | OAc(α) | t-butyl | OCH₃ (α) | Hg(OAc)₂ | CH₃OH | 25° |
| C₆H₅-CH=N- | OAc(α) | CH₃O-C₆H₄-CH₂ | OCH₃ (α) | Hg(OCH₃)₂ | CH₃OH | 25° |
| (piperidinyl)N-C(H)=N- | OAc(α) | t-butyl | OCH₂CH₃ (α) | Hg(OAc)₂ | CH₃CH₂OH | 25-80° |
| O₂N-C₆H₄-CH=N- | OAc(α) | t-butyl | -N₃ (α) | Hg(OAc)₂ | NaN₃, DMF | 25° |
| C₆H₅-CH=N- | OAc(α) | t-butyl | (CH₃)₂N- (α+β) | Hg(OAc)₂ | (CH₃)₂NH, DMF | 25° |

What is claimed is:
1. A process for the preparation of compounds of the formula:

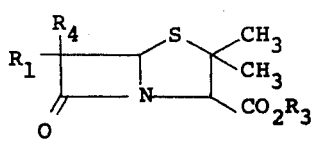

wherein $R_1$ is selected from the group consisting of benzalimino, p-nitrobenzalimino, p-methoxybenzalimino, thienylacetamido, α-aminophenylacetamido, α-amino-1,4-cyclohexadienylacetamido, phenylacetamido, and phenoxyacetamido; $R_4$ is selected from the group consisting of lower alkoxy, lower alkanoyloxy, phenoxy, and azido; and $R_3$ is selected from the group consisting of hydrogen, methyl, t-butyl, trichloroethyl, trimethylsilyl, p-methoxybenzyl, and a cation; which comprises reacting a compound of formula:

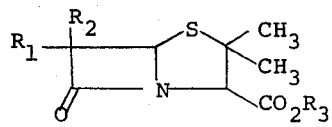

wherein $R_1$ and $R_3$ are as defined above and $R_2$ is lower alkanoyloxy; with a compound selected from the group consisting of lower alkyl alcohols, phenol, lower alkanoic acid or its heavy metal salt, sodium azide and potassium azide at a temperature of from about −10° to about 110°C in the presence of a catalyst selected from the group consisting of mercuric acetate, mercuric chloride, silver acetate, silver tetrafluorborate, thallium acetate, and dimethoxy mercury.

2. The process of claim 1 wherein $R_2$ is acetoxy.

3. The process of claim 2 wherein $R_4$ is selected from the group consisting of methoxy, ethoxy, propionyloxy, phenoxy and azido.

4. The process of claim 2 wherein said catalyst is selected from the group consisting of mercuric acetate, dimethoxy mercury and silver tetrafluoroborate.

* * * * *

UNITED STATES PATENT OFFICE
CERTIFICATE OF CORRECTION

PATENT NO. : 3,868,365
DATED : Feb. 25, 1975
INVENTOR(S) : Joseph Edward Dolfini et al.

It is certified that error appears in the above-identified patent and that said Letters Patent are hereby corrected as shown below:

Columns 9 and 10, Table I, first line under the heading "$R_1$", "-$CH_2$-CONH" should be deleted and ---$CH_2$-CONH-- should be inserted in its place; first line under the heading "$R_3$", "t-butyl" should be deleted and --$CH_3O$--$CH_2$-- should be inserted in its place; first line under the heading "Solvent", "$CH_3OH$" should be deleted and --AcOH-- should be inserted in its place.

Signed and sealed this 15th day of July 1975.

(SEAL)
Attest:

RUTH C. MASON
Attesting Officer

C. MARSHALL DANN
Commissioner of Patents
and Trademarks